United States Patent
Mayville (10) Patent No.: US 7,950,691 B1
(45) Date of Patent: May 31, 2011

(54) INFLATOR BODY WITH ADAPTER FORM END

(75) Inventor: Brian A. Mayville, Troy, MI (US)

(73) Assignee: TK Holdings, Inc., Armada, MI (US)

( * ) Notice: Subject to any disclaimer, the term of this patent is extended or adjusted under 35 U.S.C. 154(b) by 126 days.

(21) Appl. No.: 12/290,556

(22) Filed: Oct. 31, 2008

Related U.S. Application Data (60) Provisional application No. 61/001,349, filed on Oct. 31, 2007.

(51) Int. Cl.
*B60R 21/26* (2006.01)

(52) U.S. Cl. .................... 280/736; 280/742; 102/531

(58) Field of Classification Search ............... 280/741, 280/736, 742; 102/530, 531
See application file for complete search history.

(56) References Cited

U.S. PATENT DOCUMENTS

| | | | |
|---|---|---|---|
| 1,939,700 A | 12/1933 | Hofstetter | 89/14.2 |
| 2,891,525 A | 6/1959 | Moore | 123/90.51 |
| 2,959,127 A | 11/1960 | Weinert | 102/368 |
| 3,794,347 A | 2/1974 | Zens | 280/150 |
| 3,868,124 A * | 2/1975 | Johnson | 280/737 |
| 3,877,882 A | 4/1975 | Lette et al. | 23/281 |
| 3,880,447 A | 4/1975 | Thorn et al. | |
| 3,958,949 A | 5/1976 | Plantif et al. | |
| 3,985,076 A | 10/1976 | Schneiter et al. | |
| 4,001,750 A | 1/1977 | Scherer et al. | 337/280 |
| 4,012,189 A | 3/1977 | Vogt et al. | 431/353 |
| 4,215,631 A | 8/1980 | Rucker | 102/27 |
| 4,530,516 A | 7/1985 | Adams et al. | 280/741 |
| 4,588,043 A | 5/1986 | Finn | 180/223 |
| 4,611,374 A | 9/1986 | Schnelle et al. | 29/890.13 |
| 4,722,551 A | 2/1988 | Adams | |
| 4,730,558 A | 3/1988 | Florin et al. | 102/218 |
| 4,762,067 A | 8/1988 | Barker et al. | 102/313 |
| 4,886,293 A | 12/1989 | Weiler et al. | |
| 4,938,501 A * | 7/1990 | Wipasuramonton | 280/743.1 |
| 4,950,458 A | 8/1990 | Cunningham | 422/164 |
| 5,028,070 A | 7/1991 | Bender | |
| 5,048,862 A | 9/1991 | Bender et al. | |
| 5,100,171 A | 3/1992 | Faigle et al. | 280/736 |
| 5,215,721 A | 6/1993 | Tasaki et al. | |
| 5,294,244 A | 3/1994 | Allerton, III et al. | 75/401 |
| 5,318,323 A | 6/1994 | Pietz | 280/736 |
| 5,333,656 A | 8/1994 | Mackal | 141/330 |
| 5,340,150 A | 8/1994 | Harada et al. | |
| 5,372,449 A | 12/1994 | Bauer et al. | 403/273 |
| 5,387,009 A | 2/1995 | Lauritzen et al. | |
| 5,406,889 A | 4/1995 | Letendre et al. | |
| 5,443,286 A | 8/1995 | Cunningham et al. | |
| 5,466,420 A | 11/1995 | Parker et al. | |
| 5,470,105 A | 11/1995 | Rose et al. | 280/740 |

(Continued)

OTHER PUBLICATIONS

Office Action U.S. Appl. No. 11/445,859, filed Jun. 1, 2006, Mail Date Mar. 4, 2008 (125).

(Continued)

*Primary Examiner* — Rith Ilan
(74) *Attorney, Agent, or Firm* — L.C. Begin & Associates, PLLC.

(57) ABSTRACT

A gas generating system includes a housing having an adapter formed integral with the housing to enable operative coupling of the gas generating system to an associated gas-actuatable device. The adapter may include openings formed therein to enable distribution of gases to an exterior of the housing.

5 Claims, 6 Drawing Sheets

U.S. PATENT DOCUMENTS

| | | | | |
|---|---|---|---|---|
| 5,509,686 A | 4/1996 | Shepherd et al. | ............. | 280/738 |
| 5,516,147 A | 5/1996 | Clark et al. | ................... | 280/737 |
| 5,533,751 A | 7/1996 | Kort et al. | ..................... | 280/737 |
| 5,556,439 A | 9/1996 | Rink et al. | ....................... | 55/487 |
| 5,562,304 A | 10/1996 | Gest | .............................. | 280/740 |
| 5,564,743 A | 10/1996 | Marchant | ..................... | 280/741 |
| 5,582,427 A | 12/1996 | Rink et al. | ................... | 280/740 |
| 5,588,676 A | 12/1996 | Clark et al. | ................... | 280/741 |
| 5,609,360 A | 3/1997 | Faigle et al. | ................ | 280/740 |
| 5,611,566 A | 3/1997 | Simon et al. | .................. | 280/736 |
| 5,613,703 A | 3/1997 | Fischer | ........................ | 280/741 |
| 5,622,380 A | 4/1997 | Khandhadia et al. | ......... | 280/736 |
| 5,624,133 A | 4/1997 | Wong | | |
| 5,624,134 A | 4/1997 | Iwai et al. | | |
| 5,628,528 A | 5/1997 | DeSautelle et al. | ........... | 280/736 |
| 5,630,619 A | 5/1997 | Buchanan et al. | ............. | 280/741 |
| 5,662,722 A | 9/1997 | Shiban | .......................... | 55/413 |
| 5,692,776 A * | 12/1997 | Rink et al. | ................... | 280/741 |
| 5,702,494 A | 12/1997 | Tompkins et al. | .............. | 55/498 |
| 5,725,245 A | 3/1998 | O'Driscoll et al. | | |
| 5,799,973 A | 9/1998 | Bauer et al. | ................... | 280/741 |
| 5,813,695 A | 9/1998 | O'Driscoll et al. | | |
| 5,829,785 A | 11/1998 | Jordan et al. | .................. | 280/741 |
| 5,845,935 A | 12/1998 | Enders et al. | ............... | 280/743.2 |
| 5,860,672 A | 1/1999 | Petersen | .................... | 280/728.2 |
| 5,872,329 A | 2/1999 | Burns et al. | ..................... | 149/36 |
| 5,934,705 A | 8/1999 | Siddiqui et al. | .............. | 280/736 |
| 5,941,562 A | 8/1999 | Rink et al. | .................... | 280/741 |
| 5,979,936 A * | 11/1999 | Moore et al. | .................. | 280/736 |
| 6,019,389 A | 2/2000 | Burgi et al. | .................... | 280/736 |
| 6,032,979 A | 3/2000 | Mossi et al. | .................... | 280/741 |
| 6,070,903 A * | 6/2000 | Beisswenger et al. | ........ | 280/736 |
| 6,074,502 A | 6/2000 | Burns et al. | | |
| 6,082,761 A * | 7/2000 | Kato et al. | ................. | 280/730.2 |
| 6,095,556 A | 8/2000 | Bailey et al. | .................. | 280/737 |
| 6,095,559 A | 8/2000 | Smith et al. | ................... | 280/741 |
| 6,095,561 A | 8/2000 | Siddiqui et al. | .............. | 280/472 |
| 6,106,000 A | 8/2000 | Stewart | ....................... | 280/728.2 |
| 6,116,491 A | 9/2000 | Kutoh | ............................ | 228/42 |
| 6,210,505 B1 | 4/2001 | Khandhadia et al. | .......... | 149/36 |
| 6,244,623 B1 | 6/2001 | Moore et al. | ................... | 280/471 |
| 6,308,984 B1 * | 10/2001 | Fischer | ........................ | 280/741 |
| 6,364,348 B1 | 4/2002 | Jang et al. | ................. | 280/730.2 |
| 6,379,627 B1 | 4/2002 | Nguyen et al. | ................ | 422/165 |
| 6,464,254 B2 | 10/2002 | Chikaraishi et al. | .......... | 280/741 |
| 6,474,684 B1 | 11/2002 | Ludwig et al. | | |
| 6,485,051 B1 | 11/2002 | Taguchi et al. | | |
| 6,581,963 B2 | 6/2003 | Mangum | ...................... | 280/741 |
| 6,709,012 B1 | 3/2004 | Tanaka et al. | | |
| 6,764,096 B2 | 7/2004 | Quioc | | |
| 6,776,434 B2 | 8/2004 | Ford et al. | .................... | 280/729 |
| 6,846,014 B2 | 1/2005 | Rink et al. | .................... | 280/740 |
| 6,851,705 B2 | 2/2005 | Young et al. | | |
| 6,871,873 B2 | 3/2005 | Quioc et al. | ................... | 280/741 |
| 6,908,104 B2 | 6/2005 | Canterberry et al. | .......... | 280/736 |
| 6,929,284 B1 | 8/2005 | Saso et al. | | |
| 6,935,655 B2 | 8/2005 | Longhurst et al. | ............. | 280/736 |
| 6,945,561 B2 | 9/2005 | Nakashima et al. | | |
| 6,948,737 B2 | 9/2005 | Ohji et al. | | |
| 7,073,820 B2 | 7/2006 | McCormick | .................. | 280/741 |
| 7,178,830 B2 | 2/2007 | Blackburn | .................... | 280/736 |
| 7,237,801 B2 | 7/2007 | Quioc et al. | ................... | 280/736 |
| 7,267,365 B2 | 9/2007 | Quioc | .......................... | 280/736 |
| 7,390,019 B2 | 6/2008 | Gotoh et al. | ................... | 280/741 |
| 7,401,808 B2 * | 7/2008 | Rossbach et al. | ............. | 280/737 |
| 7,654,565 B2 * | 2/2010 | McCormick et al. | ......... | 280/736 |
| 7,806,954 B2 | 10/2010 | Quioc | .......................... | 55/385.3 |
| 2002/0008373 A1 * | 1/2002 | Specht | ......................... | 280/741 |
| 2002/0053789 A1 | 5/2002 | Fujimoto et al. | | |
| 2003/0127840 A1 | 7/2003 | Nakashima et al. | | |
| 2003/0155757 A1 | 8/2003 | Larsen et al. | | |
| 2003/0197357 A1 * | 10/2003 | Heigl et al. | ..................... | 280/736 |
| 2003/0201628 A1 | 10/2003 | Choudhury et al. | | |
| 2004/0046373 A1 | 3/2004 | Wang et al. | | |
| 2004/0056461 A1 * | 3/2004 | Blackburn | .................... | 280/741 |
| 2004/0080147 A1 * | 4/2004 | Gotoh | .......................... | 280/741 |
| 2005/0001414 A1 | 1/2005 | Matsuda et al. | | |
| 2005/0134031 A1 | 6/2005 | McCormick | | |
| 2005/0146123 A1 * | 7/2005 | Bergmann et al. | ............ | 280/741 |
| 2005/0161925 A1 | 7/2005 | Blackburn | | |
| 2005/0194772 A1 | 9/2005 | Numoto et al. | | |
| 2005/0230949 A1 | 10/2005 | Blackburn | .................... | 280/736 |
| 2005/0263993 A1 | 12/2005 | Blackburn | | |
| 2005/0263994 A1 | 12/2005 | Quioc | .......................... | 280/741 |
| 2005/0280252 A1 * | 12/2005 | McCormick | .................. | 280/741 |
| 2006/0005734 A1 | 1/2006 | McCormick | | |
| 2006/0043716 A1 | 3/2006 | Quioc | | |
| 2006/0082112 A1 | 4/2006 | Blackburn | | |
| 2006/0261584 A1 | 11/2006 | Blackburn | .................... | 280/741 |
| 2006/0273564 A1 | 12/2006 | McCormick et al. | ......... | 280/740 |
| 2007/0001437 A1 * | 1/2007 | Wall et al. | ..................... | 280/736 |
| 2007/0001438 A1 | 1/2007 | Patterson et al. | .............. | 280/740 |
| 2008/0118408 A1 | 5/2008 | Numoto et al. | ................ | 422/167 |

OTHER PUBLICATIONS

Office Action U.S. Appl. No. 11/445,859, filed Jun. 1, 2006, Mail Date Sep. 18, 2008 (125).

Office Action U.S. Appl. No. 11/445,859, filed Jun. 1, 2006, Dated for Feb. 25, 2009.

Office Action U.S. Appl. No. 12/012,042, filed Jan. 31, 2008; Mailed Sep. 14, 2010 (176).

Office Action U.S. Appl. No. 12/655,768, filed Jan. 7, 2010, Dated Oct. 1, 2010 (02125).

* cited by examiner

INFLATOR BODY WITH ADAPTER FORM END

CROSS-REFERENCE TO RELATED APPLICATIONS

This application claims the benefit of U.S. Provisional Application Ser. No. 61/001,349 filed on Oct. 31, 2007.

BACKGROUND OF THE INVENTION

The present invention relates generally to gas generating systems, and to gas generant compositions employed in gas generator devices for automotive restraint systems, for example.

As known in the art, gas generating systems may be used for providing a supply of inflation or actuation gas to a gas-actuated element of a vehicle occupant protection system. An ongoing challenge is to simplify the manufacture of a gas generating system by reducing the size, weight, and number of constituents required in the production thereof. For example, in many gas generators used in vehicle occupant protection systems, several discrete compositions are provided to serve correspondingly discrete functions. These compositions often include a primary gas generating composition that when combusted provides sufficient quantities of gaseous products to operate an associated restraint device, such as an airbag or seatbelt pretensioner.

A booster composition is utilized to elevate the pressure and heat within the gas generator prior to combustion of the primary gas generant, thereby creating conditions within the inflator which facilitate efficient combustion of the primary gas generant.

Yet another composition is an auto-ignition composition employed to provide safe combustion of the other compositions in the event of a fire. The auto-ignition composition is designed to ignite at temperatures below the melting point of the primary gas generant for example, thereby ensuring the controlled combustion of the primary gas generant. Ignition of the autoignition composition provides the flame front and pressure front necessary to safely ignite a gas generant composition residing in combustible communication with the autoignition composition. As a result, the main gas generant is safely ignited prior to melting.

However, while each separate composition contributes to efficient and effective operation of the gas generating system, each composition also adds weight, cost (in materials and assembly time), and volume to the system. For example, to facilitate operation of each composition and to prevent mixing between the various compositions, the booster composition, gas generant, and autoignition compositions are typically stored in separate tubes or chambers. Provision of a separate storage chamber for each composition generally adds to the weight, cost, and assembly time needed to construct the gas generating system. In addition, if a relatively greater the amount of combustible material is burned during operation of the system, a correspondingly greater amount of effluent and heat will be usually generated by the burning of the material. Therefore, it would be advantageous to reduce the number of gas generating system components and the number of compositions used in the operation of the system.

SUMMARY OF THE INVENTION

In one aspect, a gas generating system is provided including a housing having an adapter formed integral with the housing to enable operative coupling of the gas generating system to an associated gas-actuatable device.

In another aspect, a gas generating system is provided including a housing, a gas generant composition positioned within the housing, a booster composition positioned within the housing, and no structure within the housing separating the gas generant composition from the booster composition.

In another aspect, a housing for a gas generating system is provided. The housing includes an adapter formed integrally therewith to enable operative coupling of the housing to a gas-actuatable device.

DETAILED DESCRIPTION

Figure 1:
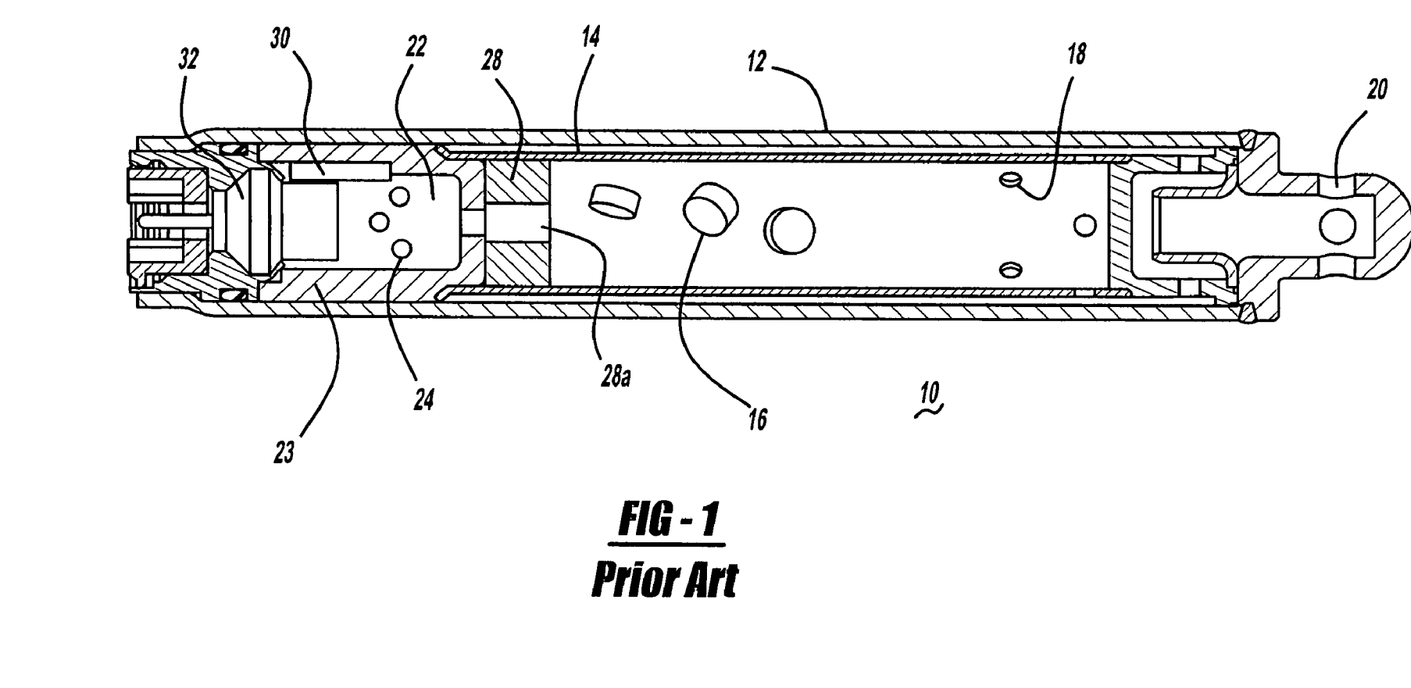
FIG. 1 is a cross-sectional side view showing the general structure of a conventional gas generating system incorporating separate booster and gas generating chambers.
Figure 2:
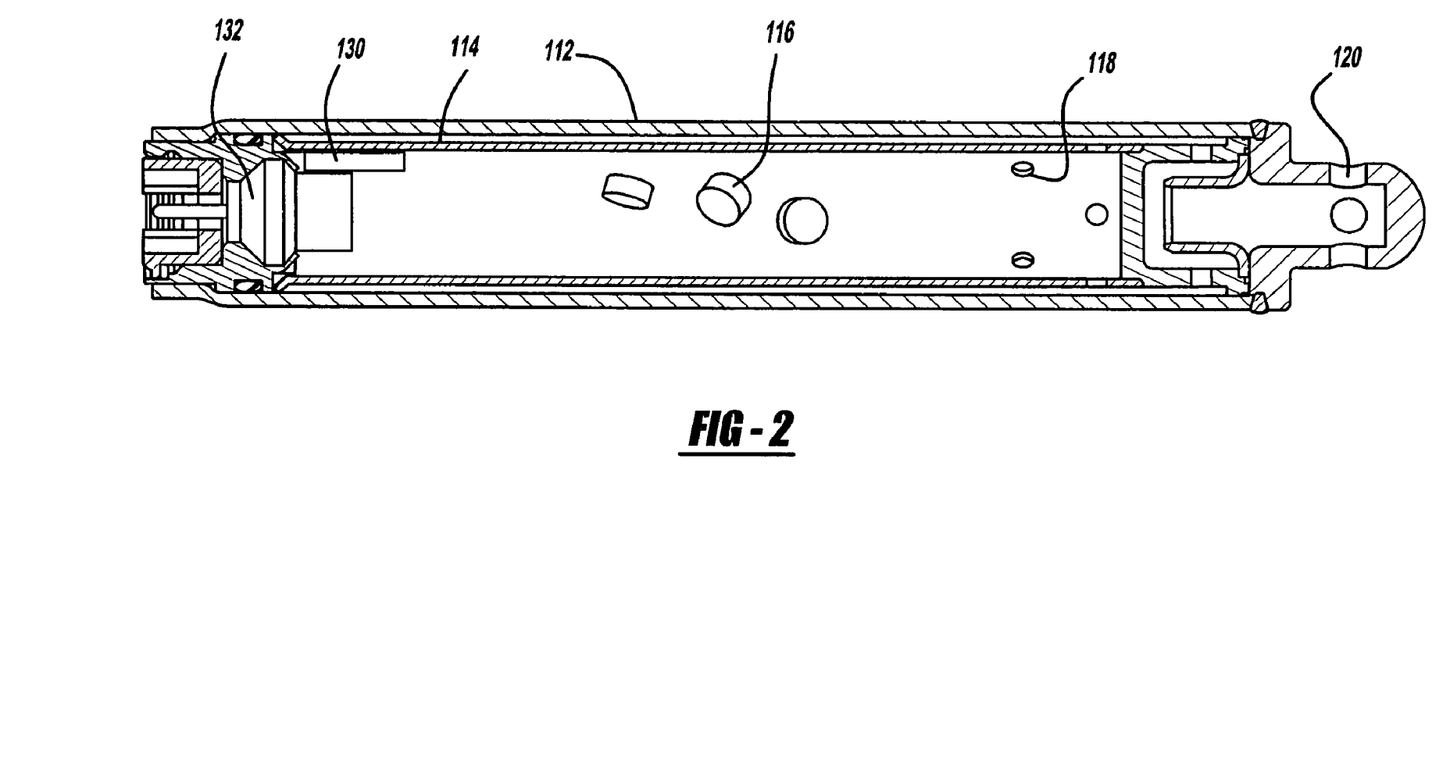
FIG. 2 is a cross-sectional side view showing the general structure of a gas generating system in accordance with the present invention, in which the booster chamber has been eliminated.
Figure 4:
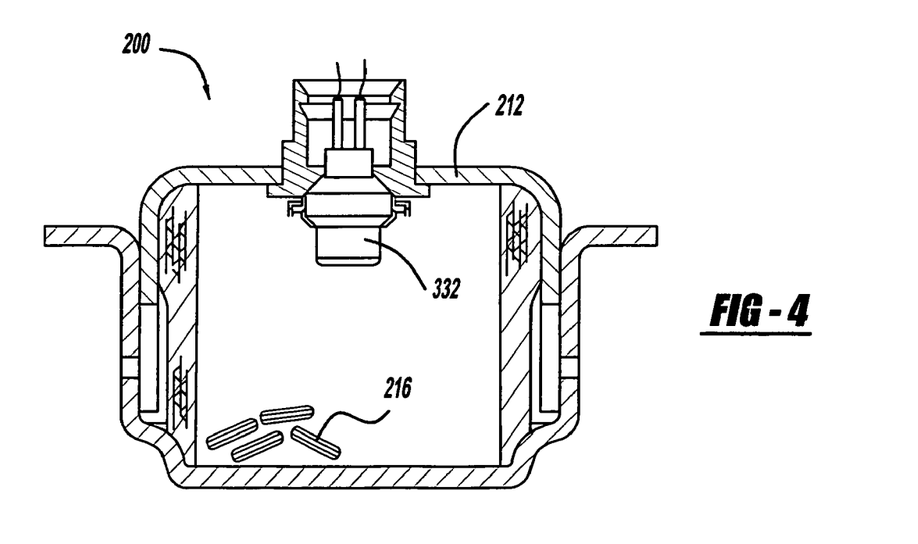
FIG. 4 is a cross-sectional side view showing the general structure of a gas generating system in accordance with an alternative embodiment of the present invention, in which the booster chamber has been eliminated.

FIG. 1 shows a cross-section of a conventional gas generating system 10 incorporating separate booster and gas generating chambers therein. The embodiments of the gas generating system shown in FIGS. 1, 2, and 4 are in the form of inflators usable for inflating associated elements of a vehicle occupant protection system, for example. However, such gas generating systems may also be used in other applications. The structure and operation of the basic system components described herein is known in the art. In addition, the materials and techniques used in manufacturing the structural components of the gas generating system are known in the art.

System 10 includes an outer housing 12 and an inner housing 14 positioned within the outer housing and containing a quantity of gas generant material 16 therein. Outer housing has a longitudinal axis "A". Inner housing 14 defines a combustion chamber for the gas generant. Inner housing orifices 18 provide fluid communication between the interior and exterior of inner housing 14. A fluid flow path is provided within housing 12 and between orifices 18 and gas exit openings 20 formed in an end or other portion of housing 12. A booster chamber 22 is formed by a booster cup 23 and a divider 28. Chamber 22 houses a booster composition 24 therein. Divider 28 separates booster composition 24 from gas generant 16 and enables fluid communication (via opening 28a) between the booster chamber and the combustion chamber upon activation of the gas generating system and combustion of the booster composition. As used herein, the term "booster chamber" is understood to designate any structure and/or components which perform the function of separating the booster composition from the gas generant composition. An initiator 32 is provided for initiating combustion of booster composition 24 upon receipt of an activation signal, in a manner known in the art. An autoignition material 30 is positioned so as to provide or enable fluid communication with the booster composition 24 upon exposure of the system to an elevated external temperature (such as that produced by a fire, for example) sufficient to cause ignition of the autoignition material.

FIG. 2 shows a cross-sectional side view showing the general structure of a gas generating system 100 in accordance with the present invention. Components common to the systems shown in FIGS. 1, 2, and 4 have been given similar element numbers for simplicity and clarity. It may be seen from a comparison of FIGS. 1 and 2 that the separate booster composition 24 and booster chamber 22 shown in FIG. 1 have been eliminated in the system shown in FIG. 2. This is accomplished through the use of a gas generant composition 116 in accordance with one of the embodiments described herein. Such compositions perform the functions of both gas generant and booster compositions, or the functions of gas generant, booster, and autoignition compositions, thereby eliminating the need for separate compositions and the structure (such as the booster cup and divider) needed to separate and support the separate compositions. This reduces system weight and enables the length of the system envelope to be shortened. Where a gas generant is formulated which serves the functions of only gas generant and booster compositions, a separate autoignition composition may still be provided in an appropriate location within the gas generating system to ensure safe actuation of the system in case of fire, as previously described.

In one embodiment, gas generant compositions in accordance with the present invention contain a first oxidizer selected from alkali, alkaline earth, and transitional metal chlorates, and mixtures thereof, such as potassium chlorate, at about 10-60 weight %; a primary fuel selected from carboxylic acids and dicarboxylic acids, such as DL-tartaric acid, at about 15-45 weight %; a secondary oxidizer selected from metal and nonmetal nitrates, nitrites, oxides, and other known oxidizers at about 30-50%; and a secondary fuel selected from tetrazoles, triazoles, furazans, and salts thereof at about 0-30 weight %, said weight percent calculated with regard to the weight of the total composition. Extrusion aids or processing additives such as graphite or fumed silica may be added in relatively smaller amounts, such as 0.1-2% by weight of the total composition for example.

In another embodiment, gas generant compositions in accordance with the present invention contain a metal chlorate such as potassium chlorate; a primary fuel selected from carboxylic acids and dicarboxylic including DL-tartaric acid, L-tartaric acid, D-tartaric acid, succinic acid, glutamic acid, adipic acid, mucic acid, fumaric acid, oxalic acid, galactaric acid, citric acid, glycolic acid, L-malic acid, and compounds having at least one —COOH— group, and mixtures thereof; a second fuel selected from an azole including tetrazoles, triazoles, furazans, salts thereof, and mixtures thereof; a secondary oxidizer selected from metal and nonmetal nitrates or other known oxidizers not containing a perchlorate. However, it will be appreciated that any composition that provides the multifunctional benefits of gas generant, booster, and (optionally) autoignition is contemplated.

The carboxylic acid or dicarboxylic acid will preferably have a primary hydrogen or PKA less than or equal to 3. Nevertheless, it has been found that with certain fuels/salts, the pKa of the base acid may range up to 5.0 or less.

In a particular embodiment, the total fuel constituent including the carboxylic fuel and the second fuel is provided at about 20-45% by weight of the total composition; the oxidizer constituent is provided at about 20-50% by weight of the total composition; and the potassium chlorate or metal chlorate is provided at about 10-60% by weight of the total composition wherein the weight percent of the chlorate is separately calculated from that of the oxidizer. The composition may be formed by wet or dry mixing the constituents in a granulated form in a known manner, and then pelletizing or otherwise forming the composition for further use. The constituents may be provided by Fisher Chemical, Aldrich Chemical, GFS, and other known suppliers.

Embodiments of the present invention are exemplified by the following Examples:

Comparative Example 1

A known gas generant composition was prepared by homogeneously mixing dried and granulated D-glucose at about 26.875 wt % and potassium chlorate at about 73.125 wt %, the percents stated by weight of the total composition. The composition autoignited at about 144° C. as measured by DSC analysis. The propellant formed from the constituents resulted in an approximate 55.5% gas yield. The impact sensitivity of this formulation had an HD50 of 2.0 inches as conducted in conformance with the Bruceton Test.

Example 2

An exemplary formulation was provided that functions as a booster, an autoignition composition, and a gas generant composition. The formulation contains 5-aminotetrazole at about 19.0 wt %, DL-tartaric acid at about 20.0 wt %, strontium nitrate at about 35.0 wt %, and potassium chlorate at about 26.0 wt %. The constituents were previously and separately ground to a relatively small size in a known manner. They were then dry-mixed to form a substantially homogeneous composition. The composition autoignited at about 140° C. as measured by DSC analysis. The propellant formed from the constituents resulted in an approximate 67% gas yield. The impact sensitivity of this formulation had an HD50 of 11.5 inches as conducted in conformance with the Bruceton Test. The composition was aged for about 480 hours at 107 C and still autoignited at about 145.1° C. as determined by DSC analysis.

Example 3

Figure 3:
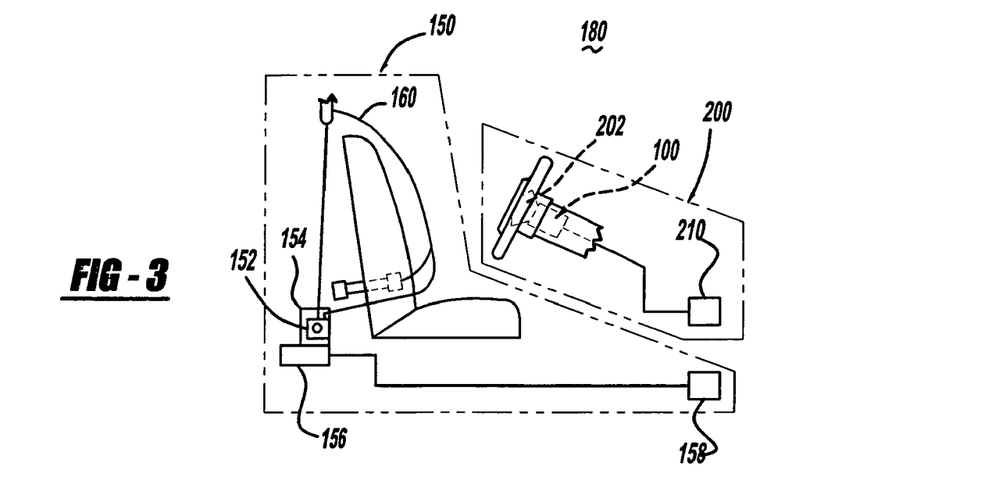
FIG. 3 is a schematic representation of an exemplary vehicle occupant restraint system containing a gas generant composition in accordance with the present invention.

An exemplary formulation was provided that functions as a booster, an autoignition, and a gas generant composition. The formulation contains 5-aminotetrazole at about 19.0 wt %, DL-tartaric acid at about 19.0 wt %, strontium nitrate at about 50.0 wt %, and potassium chlorate at about 12.0 wt %. The constituents were granulated and dry-mixed to form a substantially homogeneous composition. The composition autoignited at about 141° C. as measured by DSC analysis. The propellant formed from the constituents resulted in an approximate 68.2% gas yield. The impact sensitivity of this formulation had an HD50 of 8.8 inches as conducted in conformance with the Bruceton Test. As shown in FIG. 3, the composition reflected a relatively strong burn rate across several pressure regimes, and in particular indicated burn rates of over 0.8 inches per second (ips). Again referring to FIG. 3, it can be seen that the composition exhibited a burn rate of about 0.2 ips at about 200 psig, about 0.35 ips at about 550 psig, about 0.5 ips at about 1000 psig, about 0.55 ips at about 1500 psig, about 0.85 ips at about 2000 psig, about 0.9 ips at about 2500 psig, about 0.85 ips at about 3000 psig; and about 1.2 ips at about 3900 psig. It can therefore be seen that a composition in accordance with the present invention exhibits a satisfactory burn rate (typically 0.4 ips or more at about 2500-3000 psig) thereby ensuring satisfactory functionality as a primary gas generant. The composition was aged for about 480 hours at 107° C. and still autoignited at about 174.7° C. as determined by DSC analysis.

Example 4

An exemplary formulation was provided that functions as a booster, an autoignition, and a gas generant composition. The formulation contains DL-tartaric acid at about 28.0 wt %, strontium nitrate at about 32.0 wt %, and potassium chlorate at about 30.0 wt % and 10% of a secondary fuel. The constituents were previously and separately ground to a relatively small size in a known manner. They were then dry-mixed to form a substantially homogeneous composition. The composition autoignited at about 153° C. as measured by DSC analysis. The propellant formed from the constituents resulted in an approximate 66.1% gas yield. The impact sensitivity of this formulation had an HD50 of 8.1 inches as conducted in conformance with the Bruceton Test.

As indicated in Examples 1-4, compositions formed in accordance with the present invention (Examples 2-4) preferably autoignite at or below about 180° C. and provide a booster function as well. The compositions of the present invention may also produce substantial quantities of gas, and exhibit sufficient burn rates thereby producing sufficient amounts of gas when activated. Compositions employing a secondary oxidizer, such as strontium nitrate, provide relative increased quantities of gas and an improved sensitivity. A Bruceton sensitivity result wherein $H_{50}$=3.9 or more relaxes the packaging requirements as per U.S.D.O.T regulations. Accordingly, compositions having a sensitivity result of 3.9 or greater provide substantial packaging advantages. It will further be appreciated that the use of a secondary fuel, such as 5-aminotetrazole, in conjunction with the carboxylic or dicarboxylic acid, the secondary oxidizer, and the potassium chlorate produces greater amounts of gas, acceptable autoignition temperatures, and booster functionality. As such, compositions formed in this manner may be provided to singularly replace the three discrete booster, autoignition, and primary gas generant compositions normally found in a gas generator.

Examples 5-16

As shown in Table 1 below, the various acids shown, when converted to salts and mixed with potassium chlorate in stoichiometric amounts exhibit acceptable autoignition temperatures for a variety of uses. Certain autoignition temperatures exceed 180° C. but may still be useful in selected applications such as hybrid inflators and seatbelt pretensioners for example. It will be appreciated that these Examples reflect the autoignition character imparted by the resulting salts and the potassium chlorate. As further shown, acids exhibiting a pKa of about 3.05 or less generally provide autoignition temperatures generally less than 170-180° C. However, acids exhibiting a pKa of about 5.0 or less may still be acceptable wherein autoignition temperatures of 250° C. or so are acceptable, for example. It will be appreciated that certain acids such as citric acid and malonic acid when stoichiometrically combined with potassium chlorate may not satisfy the autoignition function, but still when combined with at least a second oxidizer function as a booster oxidizer and a primary gas generant. It has further been determined that the use of a desiccant as described in co-owned and co-pending U.S. Ser. No. 11/479,493, herein incorporated by reference, may in certain circumstances maintain optimum environmental conditions within the gas generator thereby facilitating the tri-functionality of the composition when used as an autoignition, booster, and primary gas generating composition.

TABLE 1

| Name | Structure | Lit. mp | DSC/TGA | Hot Plate | Stoichiometric Mixture w KC PKa |
|---|---|---|---|---|---|
| L-Tartaric Acid | (structure shown) | 168-170 | AI 142 | 154 | 3.02 |
| D-Tartaric Acid | | 168-170 | | | 2.98 |
| DL-Tartaric Acid | | 206 | AI 171 | 185 | |
| Meso-Tartaric Acid | | 140 | | | 3.22 |
| Succinic Acid | (structure shown) | 188-190 | mp 184 followed by small exo; no TGA step function | 210 | 4.16 |

TABLE 1-continued

| Name | Structure | Lit. mp | DSC/TGA | Hot Plate | Stoichiometric Mixture w KC PKa |
|------|-----------|---------|---------|-----------|-------------------------------|
| Diglycolic Acid | HOOC-CH$_2$-O-CH$_2$-COOH | 142-145 | mp 130 followed by small exo; TGA slow dec. | 155 | 3.28 |
| Malonic Acid | HOOC-CH$_2$-COOH | 135-137 | mp 124 followed by small exo; TGA slow dec. | >250 | 2.83 |
| Trans-Glutaconic Acid | HOOC-CH=CH-CH$_2$-COOH | 137-139 | mp 136 AI 166 | 188 | |
| D-Glutamic Acid | HOOC-CH(NH$_2$)-CH$_2$-CH$_2$-COOH | 200-202 | mp 206; AI 213 | 235 | 2.13 |
| Adipic Acid | HOOC-(CH$_2$)$_4$-COOH | 152-154 | mp 153; AI 222 | 237 | 4.43 |
| Mucic Acid | HOOC-CH(OH)-CH(OH)-CH(OH)-CH(OH)-COOH | 215 | AI 200 | 223 | 3.08 |
| Citric Acid | HOOC-CH$_2$-C(OH)(COOH)-CH$_2$-COOH | 152-154 | mp 141 followed by small exo; no TGA step function | >250 | 3.12 |

It will be appreciated that in further accordance with the present invention, gas generators made as known in the art and also vehicle occupant protection systems manufactured as known in the art are also contemplated. As such, autoignition compositions of the present invention are employed in gas generators, seat belt assemblies, and/or vehicle occupant protection systems, all manufactured as known in the art.

In yet another aspect of the invention, the present compositions may be employed within a gas generating system. For example, as schematically shown in FIG. 3, a vehicle occupant protection system made in a known way contains crash sensors in electrical communication with an airbag inflator in the steering wheel, and also with a seatbelt assembly. The gas generating compositions of the present invention may be employed in both subassemblies within the broader vehicle occupant protection system or gas generating system. More specifically, each gas generator employed in the automotive gas generating system may contain a gas generating composition as described herein.

Extrusion aides may be selected from the group including talc, graphite, borazine [(BN)$_3$], boron nitride, fumed silica, and fumed alumina. The extrusion aid preferably constitutes 0-10% and more preferably constitutes 0-5% of the total composition.

The compositions may be dry or wet mixed using methods known in the art. The various constituents are generally provided in particulate form and mixed to form a uniform mixture with the other gas generant constituents.

It should be noted that all percents given herein are weight percents based on the total weight of the gas generant composition. The chemicals described herein may be supplied by companies such as Aldrich Chemical Company for example.

As shown in FIG. 4, another exemplary inflator 200 incorporates a single chamber inflator design for use in a driver side airbag module. In general, an inflator containing a gas generant/booster 216 formed as described herein, may be manufactured as known in the art. U.S. Pat. Nos. 6,422,601, 6,805,377, 6,659,500, 6,749,219, and 6,752,421 exemplify typical airbag inflator designs and are each incorporated herein by reference in their entirety. In accordance with the present invention, the gas generating system 200 does not incorporate a separate booster composition and therefore does not incorporate a booster chamber. As stated previously, the use of a composition that functions as a booster and a gas generant thereby facilitates the simplification of the inflator design.

Referring now to FIG. 3, the exemplary gas generating systems 100, 200 described above may also be incorporated into an airbag system 200. Airbag system 200 includes at least one airbag 202 and a gas generating system 100 containing a gas generant composition (not shown) in accordance with the present invention, coupled to airbag 202 so as to enable fluid communication with an interior of the airbag. Airbag system 200 may also include (or be in communication with) a crash event sensor 210. Crash event sensor 210 includes a known crash sensor algorithm that signals actuation of airbag system 200 via, for example, activation of airbag gas generating system 100 in the event of a collision.

Referring again to FIG. 3, airbag system 200 may also be incorporated into a broader, more comprehensive vehicle occupant restraint system 180 including additional elements such as a safety belt assembly 150. FIG. 3 shows a schematic diagram of one exemplary embodiment of such a restraint system. Safety belt assembly 150 includes a safety belt housing 152 and a safety belt 160 extending from housing 152. A safety belt retractor mechanism 154 (for example, a spring-loaded mechanism) may be coupled to an end portion of the belt. In addition, a safety belt pretensioner 156 may, be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, each incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt assembly 150 may also include (or be in communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It should be appreciated that safety belt assembly 150, airbag system 200, and more broadly, vehicle occupant protection system 180 exemplify but do not limit applications of gas generating systems contemplated in accordance with the present invention.

Figure 5:
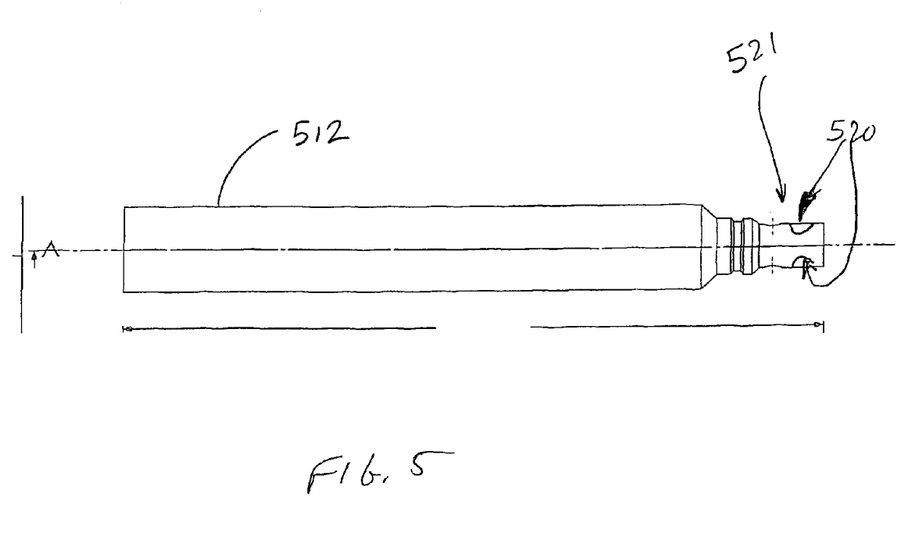
FIG. 5 is a side view of a gas generating system in accordance with one embodiment of the present invention showing a gas generating system housing incorporating an integrally-formed adapter for coupling to a gas-actuatable device and for distributing generated gases to an exterior of the system.

Referring now to FIG. 5, in a particular embodiment, an end of outer housing 512 is integrally formed into the housing in the shape of an adapter 521, to enable coupling or attachment of the gas generating system to an airbag module or other gas-actuatable device. As used herein, the terms "integral" and "integrally formed" denote the fact that the adapter is formed into the same piece of material as the outer housing (i.e., the adapter is contiguous with the remainder of the housing). Adapter 521 may be formed into any desired shape for a given application, using any of a variety of known methods such as hot swaging, cold swaging, thread-rolling, and/or any other suitable forming method, or combination of methods. At least one opening 520 is formed in adapter 521 to enable fluid communication between an interior of the housing and an exterior of the housing. Opening(s) 520 may be punched, drilled, or otherwise formed in adapter 521. Forming of adapter 521 and outer housing 512 as a monolithic unit obviates the need to manufacture, stock, and attach a separate adapter to the housing, thereby reducing the number of parts in the assembly, assembly time, and the overall production cost of the gas generating system.

Figure 6:
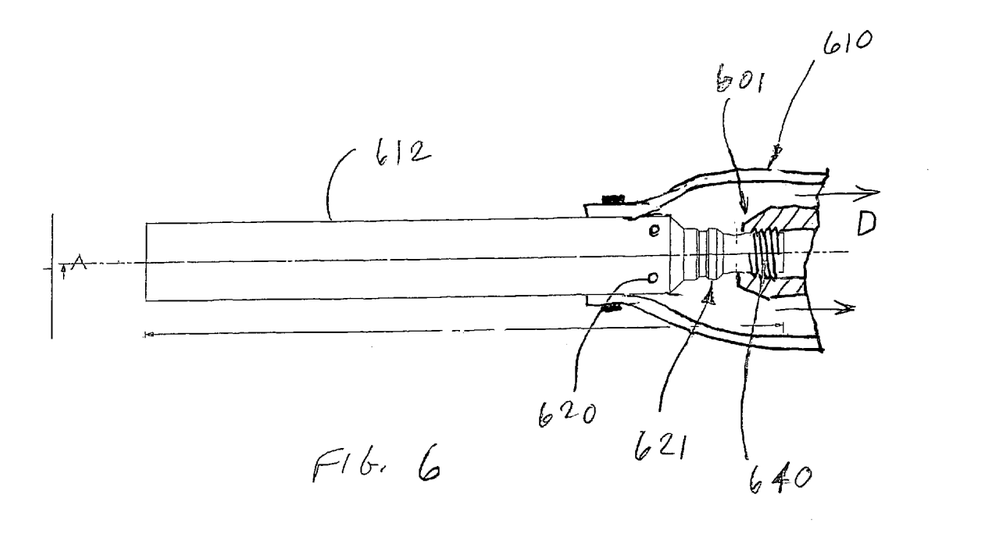
FIG. 6 is a side view showing a partial cross-section of a gas-actuatable device operatively connected to a housing of a gas generating system in accordance with another embodiment of the present invention.

Referring to FIG. 6, in another particular embodiment, an adapter 621 enables coupling of the gas generating system housing 612 to an associated gas-actuatable device 601, while the openings 620 through which the generated gases flow are not formed in the adapter but rather along a portion of the remainder of the housing. Thus, the adapter 621 serves merely to connect the housing 612 to the gas-actuatable device 601. For this purpose, any desired housing end configuration may be provided. For example, in the embodiment shown in FIG. 6, a series of threads 640 are formed along adapter 621 to enable threaded attachment of gas-actuatable device 601 thereto. Numerous alternative attachment modes are also contemplated.

Figure 7:
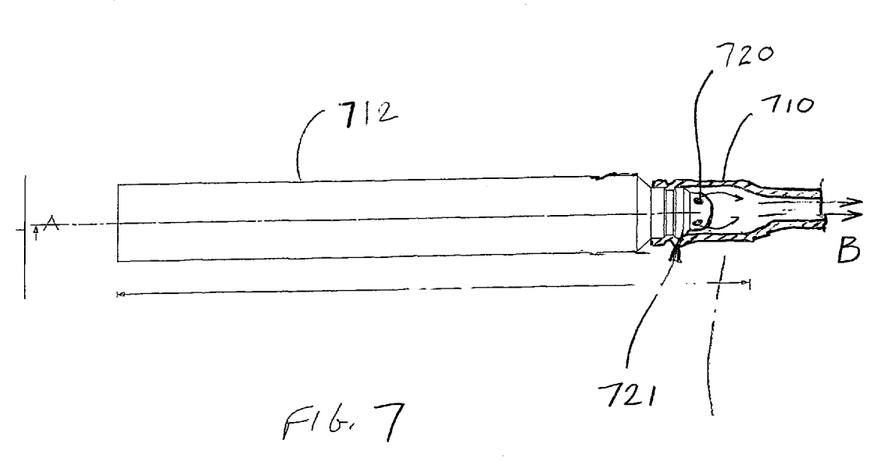
FIG. 7 is a side view showing a partial cross-section of a gas-actuatable device operatively connected to a housing of a gas generating system in accordance with another embodiment of the present invention.

Referring to FIG. 7, in another particular embodiment, a flow director 710 is coupled to a gas generating system housing 712 to direct a flow of gases emanating from the housing in a predetermined direction. In the embodiment shown in FIG. 7, flow director 710 is crimped or otherwise suitably attached to an adapter 721 formed into an end of housing 712, and directs a flow of gas emanating from the housing along a direction indicated by arrows "B", substantially parallel with housing axis "A". However, if desired, the flow director can be attached to a portion of the housing other than the adapter, or to a portion of the gas generating system other than the housing. In the embodiment shown in FIG. 6, for example, a flow director 610 is attached to a portion of the housing different from the adapter, to direct the flow of gases in the direction indicated by arrows "D".

It will be understood that the foregoing description of an embodiment of the present invention is for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A gas generating system comprising a housing including an adapter formed integral with the housing to enable operative coupling of the gas generating system to an associated gas-actuable device via the adapter, wherein at least one opening is formed along a portion of the housing other than the adapter to enable fluid communication between an interior of the housing and an interior of the gas-actuable device when the gas generating system is operatively coupled to the device, and a flow director coupled to the housing to direct a flow of gases emanating from the housing, wherein the flow director is not coupled to the housing at the adapter.

2. The gas generating system of claim 1 further comprising:

a gas generant composition positioned within the housing;
an autoignition composition positioned within the housing; and
no structure within the housing separating the gas generant composition from the autoignition composition.

3. A vehicle occupant restraint system including a gas generating system in accordance with claim 1.

4. A gas generating system comprising:

a housing including an adapter formed integral with the housing to enable operative coupling of the gas generating system to an associated gas-actuable device via the adapter, at least one opening being formed along a portion of the housing other than the adapter to enable fluid communication between an interior of the housing and an interior of the gas-actuable device when the gas generating system is operatively coupled to the device; and a flow director coupled to the housing to direct a flow of gases emanating from the at least one opening in a predetermined direction, wherein the flow director is not coupled to the housing at the adapter.

5. A vehicle occupant restraint system including a gas generating system in accordance with claim 4.

* * * * *